United States Patent

[11] 3,563,277

| [72] | Inventor | Joseph Klipper<br>9262 Florida Blvd., Baton Rouge, La. 70815 |
|---|---|---|
| [21] | Appl. No. | 857,287 |
| [22] | Filed | Aug. 29, 1969<br>Continuation-in-part of application Ser. No. 728,676, May 13, 1968, now abandoned. |
| [45] | Patented | Feb. 16, 1971 |

[54] PIPE FLANGE PROTECTIVE COVER
3 Claims, 5 Drawing Figs.

[52] U.S. Cl. .................................................. 138/96;
 24/213; 85/5
[51] Int. Cl. .................................................. B65d 59/00,
 F16l 57/00
[50] Field of Search ........................................ 138/96, 96
 (T), 89; 277/189; 285/380, 379, 45, 48, 47;
 287/189.36 (F), 189.36 (D); 85/5, 21, (Plastic
 Digest), 37, 8.3; 24/208.3, 213 (B,C&R), 216

[56] References Cited
UNITED STATES PATENTS

| 1,435,887 | 11/1922 | Anderson.................... | 285/379X |
| 1,903,220 | 3/1933 | Lemert........................ | 138/96 |
| 2,745,521 | 5/1956 | White.......................... | 285/379X |
| 2,927,497 | 3/1960 | Rapata......................... | 85/5 |
| 3,139,784 | 7/1964 | Moorman..................... | 85/5 |
| 3,218,680 | 11/1965 | Deal et al...................... | 85/5X |
| 3,272,059 | 9/1966 | Lyday et al. ................. | 85/5 |

*Primary Examiner*—Ramon S. Britts
*Attorney*—Arnold, White & Durkee

ABSTRACT: In one exemplar form, a combination of a plastic plate having spaced apertures aligned with bolt apertures of a pipe or valve section flange and a ribbed retaining plug of an elastic material for insertion through the apertures of the plate into frictional gripping contact with the flange bolt apertures to hold the plate snugly in place over the machined surface of the pipe or valve flange.

PATENTED FEB 16 1971　　3,563,277

Joseph Klipper
INVENTOR

BY Arnold, Roylance,
Kruger & Durkee

ATTORNEYS 3,563,277

PIPE FLANGE PROTECTIVE COVER

CROSS REFERENCE TO RELATED APPLICATION

The instant patent application is a continuation-in-part of application Ser. No. 728,676, entitled "Retaining Plug" filed May 13, 1968 in the name of Joseph Klipper as inventor, now abandoned.

BACKGROUND OF THE INVENTION

Pipe and valve sections customarily used in industry have flanged end portions with an array of apertures disposed adjacent the outer edges of the flange through which bolts may be disposed for connecting the pipe sections together or connecting the pipe sections to a valve section. Often the outer surfaces of the extending flanges are machined to an extremely close tolerance for enabling two machined flanged surfaces to form a liquid or airtight seal without the need of a sealing member when the sections are joined. It is common in the industry to ship the pipe and valve sections with suitable protective coverings disposed over the machined surfaces of the flanged ends to protect the surfaces during shipment. Presently, such protective coverings generally take the form of a masonite or a hard cardboard plate having holes disposed adjacent its outer edges, the holes being aligned with correspondingly disposed holes in the pipe or valve section flange. A metal clip, much like the metal brad used in securing several sheets of paper together, is inserted through the holes in the protective cover and the bolt hole aperture in the flange and the bottom ends turned outwardly to retain the cover in place.

However, the use of such masonite or cardboard plates and metal clips or brads has several disadvantages. It is difficult to secure the protective covers snugly in place by using the clips since the metal material used for the legs must be soft enough to be twisted by hand and therefore resilient enough to give and bend under stress. It is well known, especially when heavy pipe sections and valve sections are being shipped, that the handling of such sections during shipment from the factory to a job site is often times rough, and the flanges with their attached protective covers are subject to being struck and bumped repeatedly. Metal clips will flex and give with rough handling, allowing the protective covers to become loose and facilitating the entry of foreign materials such as metal shavings and filings, sand, and other abrasives that may damage the machined surface of the flange or may damage the interior of the valve section.

If the protective cover or the head of the clip is struck a glancing blow while the pipe section being handled, the metal clip will either shear away or disengage from the pipe flange. Rough handling and wet weather are arch enemies of the hardboard and cardboard covers and they are commonly damaged and often torn away from the retaining clips.

The present invention remedies the problems of the prior art by providing a combination of a thin plastic flange cover and integrally molded retaining plugs having an extended head and a cylindrical body carrying a series of extending ribs for engaging the inner surfaces of the flanged bolt holes to hold the protective plastic plate in snug intimate engagement with the machined outer surface of the pipe or valve flange under all conditions of handling and shipment. The plastic plate is resilient and practically immune to wear and tear in normal handling and impervious to the effects of weather.

SUMMARY OF THE INVENTION

The instant invention provides a novel combination of a protective flange cover and a retaining plug for attachment to the machined surface of a pipe or valve flange to protect the flange and valve during shipment. The protective cover comprises a a plastic member of the same general shape and size of the pipe or valve flange with a predetermined number of holes radially disposed about its periphery and adapted for alignment with the bolt holes of the flange.

The retaining plug comprises a cylindrical body having outwardly protruding ribs encircling the body transversely to its axis and having an extending flanged head attached concentrically thereto, which when the plug body is driven into engaging contact with the inner surfaces of bolt hole, will engage the plastic cover and hold it tightly against the machined surface of the flange. A cylindrical cavity is disposed concentrically within the body of the plug and opens outwardly through the plug tip. The cavity allows insertion of a blunt instrument such as a punch or screwdriver, struck by a hammer or mallet, to facilitate the removal of the plugs.

Accordingly, one primary feature of the present invention is to provide a novel combination of a flange protective cover and a retaining plug for maintaining the protective cover in contact with the outer machined surface of a pipe or valve flange during shipment which will not loosen or disengage during all types of handling situations and shipping conditions.

Another primary feature of the present invention is to provide a retaining plug for maintaining a protective cover over the machined surface of a pipe or valve flange that will not become loosened or disengaged by blows struck against the protective cover or the head of the retaining plug during the handling of the pipe or valve section.

Another primary feature of the present invention is to provide a protective cover for pipe or valve flanges composed of a semiflexible plastic material that can absorb blows and rough handling during shipment without deformation or breaking and is impervious to weather and the elements.

Yet another feature of the present invention is to provide a retaining plug for use in holding a protective cover over the machined outer surface of a pipe valve flange during shipment and handling that is easy to insert and remove.

Still another feature of the present invention is to provide a retaining plug of the type described that is easier to install and remove than metal clips and which may be more economically manufactured.

BRIEF DESCRIPTION OF THE DRAWINGS

In order that the manner in which the above-recited advantages and features of the invention are attained, as well as others which will become apparent, can be understood in detail, a more particular description of the invention may be had by reference to specific embodiments thereof which are illustrated in the appended drawings, which drawings form a part of the specification. It is to be noted, however, that the appended drawings illustrate only typical embodiments of the invention and therefore are not to be considered limiting of its scope for the invention may admit to further equally effective embodiments.

In the drawings.

DETAILED DESCRIPTION OF THE PREFERRED EMBODIMENTS

Figure 1:
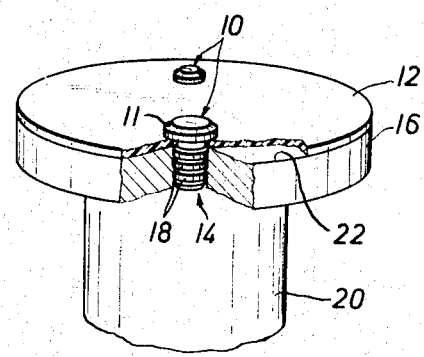
FIG. 1 is a perspective view, partly in cross section, of a plastic protective cover in place over a pipe or valve flange and showing the retaining plugs according to the present invention disposed in bolt apertures of the flange.

Referring now to FIG. 1, a respective view of a retaining plug 10 and protective cover 12 according to the present invention is shown attached in place on a flange 16 disposed on the end of a pipe section 20. Projecting ribs 18 of plug 10 make gripping contact with the inner surface of bolt aperture 14 to hold plug 10 in place and retain the plastic cover 12 in place by the action of the extending head 11.

Figure 2:
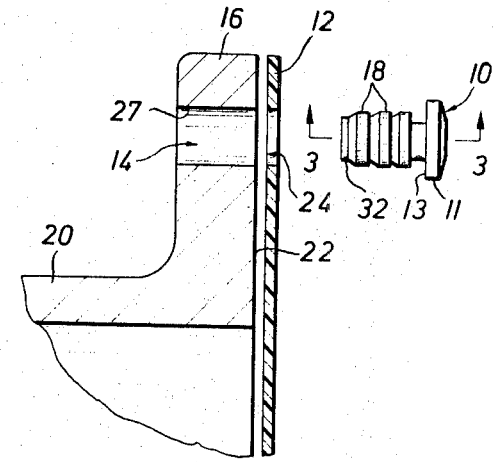
FIG. 2 is a side elevational view of the retaining plug according to the present invention and a fragmentary view of the plastic protective cover adjacent the outer surface of the pipe flange showing the disposition of the plug and cover just prior to the plug being driven into a flange bolt aperture.

In FIG. 2, a fragmentary view of a pipe section 20 having a flanged end portion 16 and a flange retaining bolt aperture 14 is shown, with a plastic cover 12 spaced adjacent the machined outer surface 22 of flange 16. Cover 12 has at least a pair of apertures 24 disposed adjacent its outer edge and concentrically aligned with apertures 14 of flange 16. Retaining plug 10 having an extending head 11 and a body section 32 with protruding rearwardly slanted ribs 18 is shown aligned with the axes of apertures 24 and 14 of the plastic cover and flange, respectively, in a position for being driven into retaining engagement with the inner surface 27 of bolt aperture 14.

Plug 10 may be driven into aperture 14 of flange 16 by using a hammer or mallet or a similar device. By striking the radially extending head 11 of plug 10 a sharp blow, the protruding ribs 18 are driven into gripping contact with the inner surface 27 of aperture 14. Head 11 has a diameter larger than the diameter of aperture 24 of the protective cover 12, and when plug 10 is driven through aperture 24 into engagement with the walls 27 of aperture 14, the lower surface 13 of head 11 makes contact with the outer surface of protective cover 12 and forces the inner surface of the plastic cover 12 into snug, intimate contact with the machined outer surface 22 of pipe flange 16.

Figure 3:
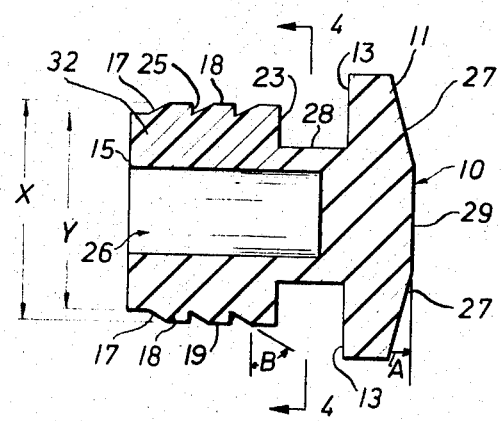
FIG. 3 is a detailed horizontal cross-sectional view of the retaining plug according to the present invention as shown taken along lines 3—3 of FIG. 2.
Figure 4:
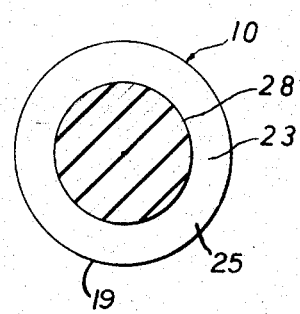
FIG. 4 is a detailed vertical cross-sectional view of the retaining plug according to the present invention as taken along lines 4—4 of FIG. 3.

Detailed cross-sectional view of the retaining plug 10 are shown in FIGS. 3 and 4, vertical and horizontal cross-sectional views, respectively, as taken along lines 4—4 of FIG. 3, respectively. Plug 10 has a flat head 11 having a central flat surface 29 and a beveled surface 27 sloping outwardly from the flat inner surface 29 to the edges of head 11. The lower surface 13 of head 11 is flat for allowing maximum area for engagement with the outer surface of protective cover 12 (see FIGS. 1 and 2). Connecting the retaining plug body 32 and the plug head 11 is a neck section 28, the diameter of which is smaller than the diameter of the bolt hole aperture 14 of flange 16 (see FIG. 2) and the diameters of body 32 and head 11, providing s shoulder 23.

It has been found convenient to make the diameter of the neck section 28 smaller than the diameter of body 32 (and smaller than the diameter of aperture 24 of cover 12 as seen in FIG. 2) in order that a small amount of rotational displacement or "play" of the cover 12 will be possible. This displacement or "play" will be afforded by moving cover 12 within the cavity between shoulder 23 and the bottom surface 13 of head 11 when plug 10 is in place. Such movement allows the cover 12 to be shifted slightly to align apertures 24 with the flange bolt apertures 14 when inserting plugs 10. After insertion of all of the necessary retaining plugs 10, if the head 11 are each tapped with a hammer to tightly seat the plugs 10, the bottom plug head surface 13 will tightly hold cover 12 against flange surface 22 and prevent further displacement or "play" during shipping or handling.

Plug body 32 is integrally attached to and extends outwardly from neck section 28 and contains a plurality of spaced outwardly extending engaging ribs 18. Each of the ribs 18 have an identical cross section, having an outer surface 17 slanting in the direction away from the plug tip 15 and toward the head 11. The shoulder 25 of the rib is perpendicular to the axis of the plug body. The ribs are truncated and the outer edge of rib 18, connecting slanting surface 17 and the rib shoulder 25, is a flat surface 19 lying parallel to the longitudinal axis of plug 10. Concentrically disposed within plug body 32 is an outwardly opening cylindrical cavity 26 communicating with the tip end 15 of plug 10.

Referring now to FIGS. 1, 2, 3 and 4, plug 10 is preferably made of an elastic material such as rubber composition, synthetic rubber, polyurethane, polyethylene or a similar synthetic material, a low-density polyethylene having been found preferably for most applications. The protective plate is preferably made from a low-density polyethylene for most applications, because of its toughness, ductility, abrasion and impact qualities, "cold-flow" capability upon hard impact, and superior low-temperature qualities, especially at −40° F to −75° F. The plates and plugs may be mass produced by molding and stamping processes and can be supplied in quantity to pipe and valve manufacturers at a cost substantially below the cost of the cardboard or hardboard plates and metal clips presently used.

It has also been found preferable to make the retaining plug 10 of suitable dimensions such that the diameter Y of the plug body 32, see FIG. 3, is slightly smaller than the diameter of the flange bolt aperture 14. Further, it has been found preferably that the diameter X of the plug body 32, measured between the outer surfaces 19 of engaging ribs 18, be slightly larger than the diameter of the flange bolt aperture 13. For example, it has been found convenient to use a plug body diameter Y of 0.730 inch and a maximum engaging rib diameter X of 0.770 inch for use in a flange bolt aperture 14 having a diameter of 0.750 inch. Of course, other suitable relationships of the plug body diameter Y and the engaging rib diameter X to the diameter of the flange bolt apertures 14 may be utilized, depending on the type and resiliency of the material of which plug 10 is constructed, and the desired engaging pressure and resistance to removal exerted by engaging ribs 18 against the inner surface 27 of the bolt aperture 14.

To facilitate entry of the plug body 32 into aperture 14, a rearward slant is provided to the engaging rib outer surface 17. As plug body 32 is driven into the flange bolt aperture 14, engaging ribs 18 are compressed inwardly by the inner surface 27 of aperture 14, thereby flattening even further the rearwardly slanted outer surfaces 17 of each rib, and flexing plug body 32 inward toward cavity 26 to facilitate the insertion of the plugs. After plug 10 has been driven into place the engaging ribs 18 tend to assume their original configuration, thereby exerting outward force transmitted through surfaces 17 and 19 against the inner aperture surface 27 and holding plug 10 firmly in place within aperture 14. The embodiment of plug 10 illustrated herein is advantageously suited for gripping the smooth inner surfaces 27 of flange bolt apertures 14, however, it may be seen that plug 10 may conveniently be used when aperture 14 is threaded.

As shown in the drawings, surface 17 is slanted with respect to the vertical. The angular slant of surface 17 is shown at B in FIG. 3. The slant shown at B in FIG. 3 minimizes friction between surface 17 and the walls 27 of aperture 14 when the plug is driven into the aperture. It has been found that an angle of 55° for B is suitable for accomplishing this purpose. However, other angles may be utilized to accomplish the same purpose for other applications.

As shown in the embodiment of the retaining plug 10 illustrated herein, the plug has a circular head 11 having a central top surface and a tapering outer surface 27. The outwardly and downwardly sloping tapered surface has been found advantageous in preventing shearing of the head 11 from neck 28 and plug body 32 after the plug has been installed. Since there is no sharply projecting upper corner on the edge of the head 11, sidewise blows striking the top surface or the outer edges of head 11 will flance from the head. Of course, it may be seen that head 11 may be of any shape, circular, square, hexagonal, etc., as may be found convenient in different applications. A taper of 15° as shown at A in FIG. 3 has been found suitable to accomplish the purpose.

Figure 5:
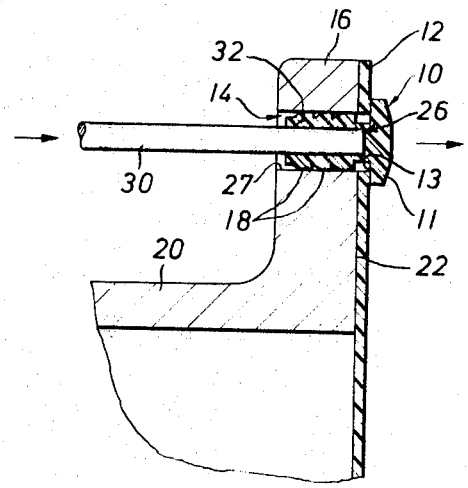
FIG. 5 is a fragmentary vertical cross-sectional view of the protective cover, retaining plug and pipe flange showing the relationship of the cover and flange when the retaining plug is disposed in a bolt aperture of the pipe flange and illustrating a method of removing the plug and cover.

Referring now to FIG. 5, a convenient method of removing the retaining plugs 10 from the flange 16 is shown. A retaining plus 10 is shown disposed in engaging contact with the inner surfaces 27 of a flanged bolt aperture 14 with the lower flat surface 13 of the plug head 11 holding the protective cover 12 in snug fitting engagement with the outer machined surface 22 of the pipe or valve flange 16. Engaging ribs 18 projecting from the body 32 of plug 10 are in gripping engagement with the inner surface 27 of the bolt aperture 14 preventing the withdrawal of the plug 10.

It is contemplated that a workman will insert a tool having a blunt end such as a punch 30 or a screwdriver or the like, into the concentric cavity 26 disposed within the body of plug 10, and by striking a sharp blow with a hammer, mallet, or a like instrument, will force the plug 10 in the direction indicated by the arrow and pop it out of engagement with aperture 14, thus freeing protective cover 12 and allowing its removal. Plugs 10 are designed to be expendable, and would ordinarily be thrown away after removal on the job site, as would plates 12. However, unless the plugs or plates have been damaged during shipment of the pipes or valves, the plugs and plates may be reused.

Numerous variations and modifications may obviously be made in the structure herein described without departing from the present invention. Accordingly, it should be clearly understood that the forms of the invention herein described and shown in the figures of the accompanying drawings are illustrative only and are not intended to limit the scope of the invention.

I claim:

1. A protective cover for attachment to a machined surface of the flanged end of a pipe or valve section and adapted for cooperating with bolt apertures in the flange for securing the cover in place, comprising in combination:

a circular plate of a plastic material having a diameter substantially the same as the diameter of the flange and having at least a circumferentially spaced apart pair of apertures therethrough;

said apertures being radially disposed adjacent the outer edge of the plate and concentrically aligned with corresponding bolt apertures in the flange when said plate is aligned over the machined surface of the flange; and at least a pair of removable retaining plugs of an elastic material, each having a cylindrical body section and an enlarged head section, said body section having a plurality of outwardly extending circumferential flexible ribs adapted for insertion through said pair of plate apertures and into snug frictional engagement with the inner surface of the flange bolt apertures while said head section frictionally engages said plate for holding said plate in snug protective contact with the machined surface of the flange, said plugs each having an axial cavity communicating with the end of said body section for facilitating the insertion of a tool for removal of said plugs from said pipe flange apertures.

2. The retaining plug as described in claim 1, wherein said retaining plug comprises:

a cylindrical body section having a first diameter and first and second ends and a cylindrical cavity having a second diameter smaller than said first diameter concentrically disposed therein and communicating with said first end, said cylindrical body section further having a plurality of projecting truncated ribs disposed circumferentially about said cylindrical body in a spaced-apart relationship for frictionally engaging the inner surface of the bolt apertures;

said ribs having slanted planar surfaces projecting from the surface of said body section toward said second end and terminating in an outer rib surface parallel to the axis of said body section;

a neck section having a third diameter smaller than said first diameter of said body section and greater than said second diameter of said cavity, said neck section axially projecting from said second end of said body section; and a relatively flat circular head section having a fourth diameter greater than said first, second and third diameters and projecting concentrically from said neck section, said head section having a beveled outer surface and a flat inner surface integrally connected with said neck for contacting the outer surface of said circular plate and firmly holding the plate against the machined surface of the flange.

3. A unitary retaining plug cooperating with bolt apertures disposed in the flanged end of a pipe or valve section for holding a protective plate snugly in contact with the machined surface of the flange, comprising:

a cylindrical body portion having a first diameter and first and second ends and a cylindrical cavity having a second diameter smaller than said first diameter concentrically disposed therein and communicating with said first end, said body portion being insertable through apertures in the protective plate into the bolt apertures;

a plurality of projecting ribs disposed circumferentially about said cylindrical body in a spaced-apart relationship for frictionally engaging the inner surface of the bolt apertures, said ribs having outer slanted surfaces projecting from the surface of said body portion toward said second end and terminating in a truncated rib surface;

said outer surface of said ribs being slanted at an angle with respect to the axis of said body portion for facilitating entry of said body portion and ribs into said bolt aperture;

a relatively flat circular head portion having a third diameter greater than said first and second diameters, said head portion having beveled outer surfaces for deflecting glancing blows striking said surfaces, and a flat inner surface for contacting the surface of said protective plate and holding the plate snugly against the machined surface of the flange; and a neck portion having a fourth diameter smaller than said first and third diameters of said body portion and head portion, respectively, and greater than said second diameter of said cavity, said neck portion axially projecting from said second end of said body portion for interconnecting said head and body portions.